(12) United States Patent
Herth

(10) Patent No.: US 7,518,059 B2
(45) Date of Patent: Apr. 14, 2009

(54) VERSATILE PADDLE FAN AND CEILING ELECTRICAL BOX

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 210 days.

(21) Appl. No.: 11/233,752

(22) Filed: Sep. 23, 2005

(65) Prior Publication Data

US 2006/0016948 A1 Jan. 26, 2006

Related U.S. Application Data

(63) Continuation-in-part of application No. 10/891,665, filed on Jul. 15, 2004, now abandoned.

(60) Provisional application No. 60/523,891, filed on Nov. 20, 2003.

(51) Int. Cl.
*H01H 9/02* (2006.01)

(52) U.S. Cl. .............. 174/58; 174/57; 174/53; 220/3.5; 248/906; 248/343

(58) Field of Classification Search ............ 220/3.5, 220/3.2, 3.3, 3.4, 3.9, 3.6, 3.7, 3.8; 248/343, 248/906, 27.3, 27.1; 174/58, 50, 48, 53, 174/57, 54, 63
See application file for complete search history.

(56) References Cited

U.S. PATENT DOCUMENTS

| | | | | | |
|---|---|---|---|---|---|
| 2,480,805 | A | * | 8/1949 | Buckels | 248/219.4 |
| 2,757,817 | A | * | 8/1956 | Egan | 220/3.5 |
| 2,802,634 | A | * | 8/1957 | Everett | 248/300 |
| 2,915,266 | A | * | 12/1959 | Antonucci | 248/27.1 |
| 2,959,633 | A | * | 11/1960 | Palmer et al. | 174/50 |
| RE25,593 | E | * | 6/1964 | Palmer | 220/3.9 |
| 3,345,029 | A | * | 10/1967 | Palmer | 248/300 |
| 3,724,795 | A | * | 4/1973 | Callanan | 248/682 |
| 3,977,640 | A | * | 8/1976 | Arnold et al. | 248/542 |
| 4,007,852 | A | * | 2/1977 | Gernhardt | 220/3.2 |
| 4,176,758 | A | * | 12/1979 | Glick | 220/3.3 |
| 4,277,641 | A | * | 7/1981 | Bauer et al. | 174/661 |
| 4,724,282 | A | * | 2/1988 | Troder | 174/661 |
| 4,880,128 | A | * | 11/1989 | Jorgensen | 220/3.9 |
| 4,936,794 | A | * | 6/1990 | Shaw et al. | 439/538 |
| 5,289,934 | A | * | 3/1994 | Smith et al. | 220/3.7 |
| 5,349,134 | A | * | 9/1994 | Russell | 174/492 |
| 5,407,088 | A | * | 4/1995 | Jorgensen et al. | 220/3.9 |
| 5,480,053 | A | * | 1/1996 | Jorgensen | 220/62 |
| 5,600,093 | A | * | 2/1997 | Herth et al. | 174/53 |
| 5,606,147 | A | * | 2/1997 | Deschamps et al. | 174/491 |
| 5,628,418 | A | * | 5/1997 | Deschamps et al. | 220/3.2 |
| 5,804,764 | A | * | 9/1998 | Gretz | 174/53 |
| 5,831,213 | A | * | 11/1998 | Wright et al. | 174/64 |

(Continued)

*Primary Examiner*—Kimberly T Wood
(74) *Attorney, Agent, or Firm*—Alfred M. Walker

(57) ABSTRACT

A deep truncated cylindrical electrical box with angled molded-in internal mounting brackets on the flat side surface is mounted to the side of a wooden or metal beam. This internal mounting feature is especially of interest in old work to minimize the size of drywall cutout by limiting it to the outer contour of the electrical box. Any device, such as a paddle fan, will be directly supported by an exterior supportive L-bracket, not by the molded box itself. Replacing the L-bracket with a heavy-duty cold rolled steel bar bracket permits fastening between two beams. An alternate embodiment for the electrical box itself supports lighter loads by the electrical box itself.

10 Claims, 5 Drawing Sheets

U.S. PATENT DOCUMENTS

| | | | |
|---|---|---|---|
| 5,857,581 A * | 1/1999 | Jorgensen | 220/3.3 |
| D408,906 S * | 4/1999 | Toscano et al. | D23/411 |
| 5,988,421 A * | 11/1999 | Jorgensen | 220/3.3 |
| 6,100,469 A * | 8/2000 | Jorgensen et al. | 174/54 |
| 6,107,568 A * | 8/2000 | Schnell et al. | 174/61 |
| 6,198,045 B1 * | 3/2001 | Roesch | 174/58 |
| 6,734,356 B1 * | 5/2004 | Gretz | 174/58 |
| 6,756,541 B1 * | 6/2004 | Mollick et al. | 174/58 |
| 6,812,405 B1 * | 11/2004 | Hull et al. | 174/58 |
| 6,881,900 B2 * | 4/2005 | Halbert | 174/58 |
| 6,908,003 B2 * | 6/2005 | Feyes et al. | 220/3.2 |
| 6,909,045 B2 * | 6/2005 | Halbert | 174/50 |
| 6,943,295 B2 * | 9/2005 | Herth | 174/58 |
| 6,956,168 B2 * | 10/2005 | Herth | 174/53 |
| 6,956,172 B2 * | 10/2005 | Dinh | 174/58 |
| 6,965,077 B2 * | 11/2005 | Halbert | 174/58 |
| 7,009,110 B1 * | 3/2006 | Gretz | 174/58 |
| 7,126,058 B2 * | 10/2006 | Herth | 174/58 |
| 7,148,420 B1 * | 12/2006 | Johnson et al. | 174/58 |

* cited by examiner

VERSATILE PADDLE FAN AND CEILING ELECTRICAL BOX

RELATED APPLICATIONS

This application is a continuation-in-part of application Ser. No. 10/891,665, filed Jul. 15, 2004, now abandoned entitled "CEILING FIXTURE ELECTRICAL WORK BOX", which application is based upon provisional patent application No. 60/523,891 filed Nov. 20, 2003 and claims benefit under 35 USC § 119(e) thereof. This application incorporates by reference the details filed in application Ser. No. 10/891,665, filed Jul. 15, 2004, as published as publication number 20050109907 A1 on May 26, 2005.

FIELD OF THE INVENTION

This invention relates to residential and commercial electrical wiring, and more particularly to modular structural support ceiling fixture electrical box for mounting heavyweight or lightweight paddle fans, ceiling lighting fixtures, wall lighting sconces or smoke/carbon monoxide alarm devices.

BACKGROUND OF THE INVENTION

Paddle fans or ceiling lighting fixtures are often mounted to a bracket across a box attached to a stud in the ceiling. These bracket mounts are less than stable for the ceiling lighting fixture, making loosening and/or falling of the fixture within the realm of possibility, especially for heavy paddle fans.

Existing electrical work boxes are described in U.S. Pat. No. 4,424,406 of Slater and U.S. Pat. No. 4,436,952 of Lockwood.

Lockwood '952 describes a work box with a conventional accessory screw holding bracket protruding up from the surface of one of the walls of the work box. The protruding bracket interferes with the flush placement of the work box within a hole within a wall corresponding in shape to the exterior of the work box.

Slater '406 describes a work box in general but is silent about a mounting means for the work box.

Cylindrical work boxes with bent attachment tabs are described in U.S. Pat. No. 5,857,581 of Jorgensen, but Jorgensen '581 is not useful for heavy duty paddle fan installations.

An improvement in electrical work boxes is shown in Applicant's U.S. Pat. No. 5,600,093 of Herth and Davis, which describes an electrical work box for new work and old work, wherein a novel interior attachment is described for vertically attaching the electrical work box to a building stud via an angled screw mount within the electrical work box.

However, Herth and Davis '093 does not describe a round ceiling mounted box which can be mounted to a ceiling stud to firmly suspend a ceiling lighting fixture or smoke/carbon monoxide alarm device therefrom.

OBJECTS OF THE INVENTION

It is therefore an object of the present invention to provide an adjustable depth, new work, old work ceiling and/or paddle fan box.

It is another object of the present invention to provide side beam mounting as compared to bottom beam mounting.

It is a further object of the present invention to provide an extra deep box for paddle fan receivers that mount inside the box.

It is yet another object of the present invention to provide a molded plastic paddle fan box that is inexpensive to manufacture and can be used for other purposes such as mounting smoke and CO alarms or lighting fixtures on ceilings and walls.

It is also an object of this invention to provide an accessory steel L-bracket for use with the paddle fan box for supporting heavy loads.

It is also an object of this invention to provide a metal bracket accessory to enable the paddle fan box to be suspended between two beams via a heavy-duty telescoping bar to accommodate heavy loads.

SUMMARY OF THE INVENTION

In accordance with the foregoing objects, and others which may become apparent, the present invention includes a deep truncated cylindrical electrical box with angled molded-in internal mounting brackets on the flat side surface. These brackets are used to mount the box directly to the side of a wooden or metal beam using the proper fasteners. This internal mounting feature is especially of interest in old work to minimize the size of drywall cutout by limiting it to the outer contour of the electrical box.

Because the box itself is a molded plastic electrical box, it is inexpensive to manufacture. As such, it can be used for many functions requiring an electrical box for mounting to ceiling or wall beams for new or old work. However, since it is primarily designed for use as a paddle fan box, an accessory cold rolled steel L-bracket that fits purposeful molded recesses on the outer surfaces of the electrical box is used to support heavy loads. Two heavy-duty carriage bolts go through square holes in the top side of the L-bracket and extend through holes in the electrical box such that they emerge below the open bottom surface of the box. Any device, such as a paddle fan, attached to these bolts will be directly supported by the L-bracket, not by the molded box. The vertical side portion of the L-bracket fits the flat side portion of the electrical box with elongated holes in registration with the outer fastener holes of the angled fasteners used to attach the box, thereby also attaching the L-bracket to the beam with the same fasteners. The L-bracket also incorporates stiffening ribs which are die-formed; strategically placed molded depressions in the outer surfaces of the electrical box accommodate these ribs. Note that the internal angled fastener feature makes the use of ceiling medallions unnecessary since there would be no damaged drywall around the installation.

In some situations, interior design and architectural features dictate that a paddle fan or heavy chandelier must be suspended between two ceiling beams. A heavy-duty telescoping bar is often used for this purpose. Replacing the L-bracket with a heavy-duty cold rolled steel bar bracket, which is designed to fit the same space on the top surface of the electrical box of this invention, permits this type of attachment. The bar bracket includes an extension which serves as a flat platform for the telescoping bar, otherwise an uneven base surface would be provided by top surface of the electrical box. The bar bracket includes square holes in the same relative position as those on the L-bracket (which are in registration with holes in the electrical box) to permit the bar and bracket to bypass the molded box to directly support the load via two carriage bolts.

An alternate embodiment of the bar bracket for lighter loads would be fabricated of sheet metal and would not include the extensions carrying the square holes for the carriage bolts. In this embodiment the load would be supported by the electrical box itself.

Threaded holes in either the L-bracket or the bar bracket are used to mechanically attach these to the top surface of the molded electrical box by the use of screws from inside the box. One of these screws is also used to provide electrical ground connection to the outside metal bracket via a pigtail connection with a ring lug inside the box.

BRIEF DESCRIPTION OF THE DRAWINGS

The present invention can best be understood in conjunction with the following drawings, in which.

DETAILED DESCRIPTION OF THE INVENTION

Figure 1:
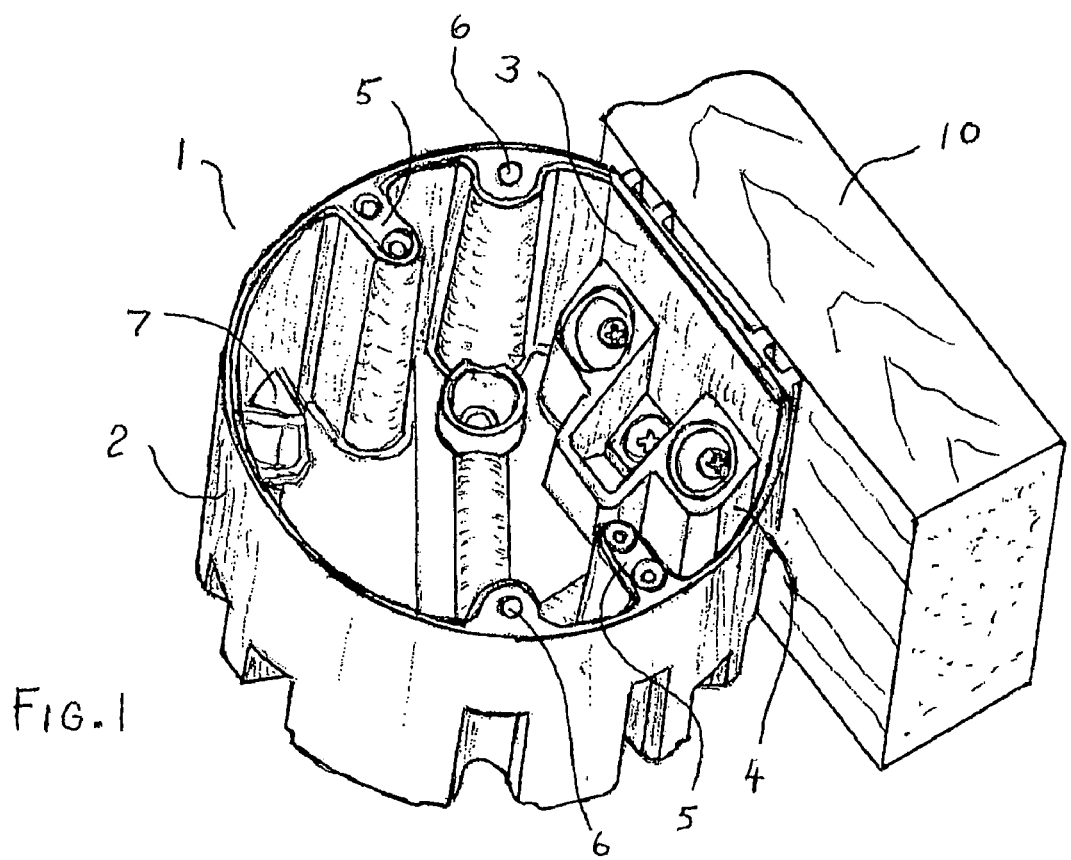
FIG. 1 is a perspective view of the open end of the paddle fan box of this invention attached to a section of wooden beam.

The molded paddle fan or electrical box 1 of this invention is shown in FIG. 1 attached to the side of wooden beam 10.

Figure 3:
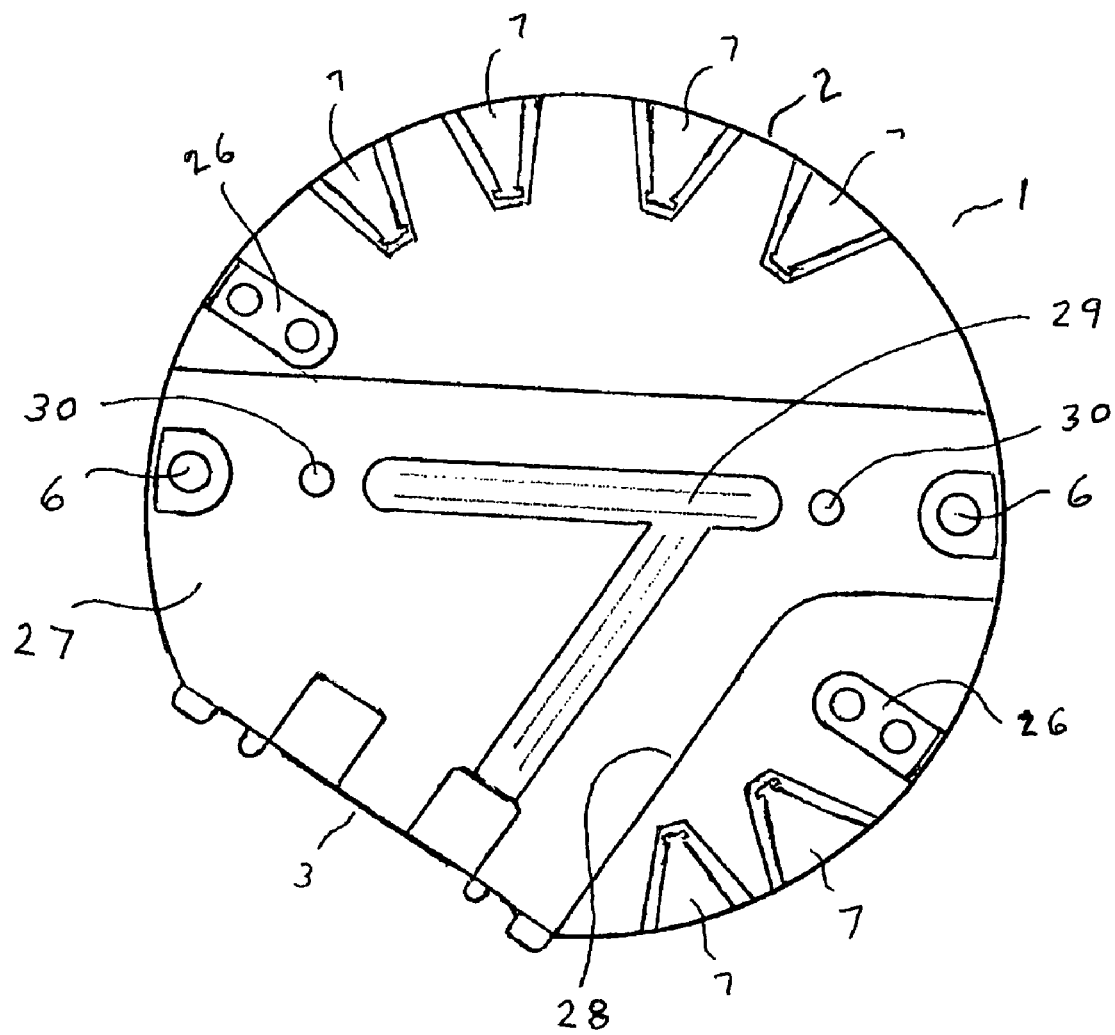
FIG. 3 is a top plan view of the outer surface of the paddle fan box.
Figure 4:
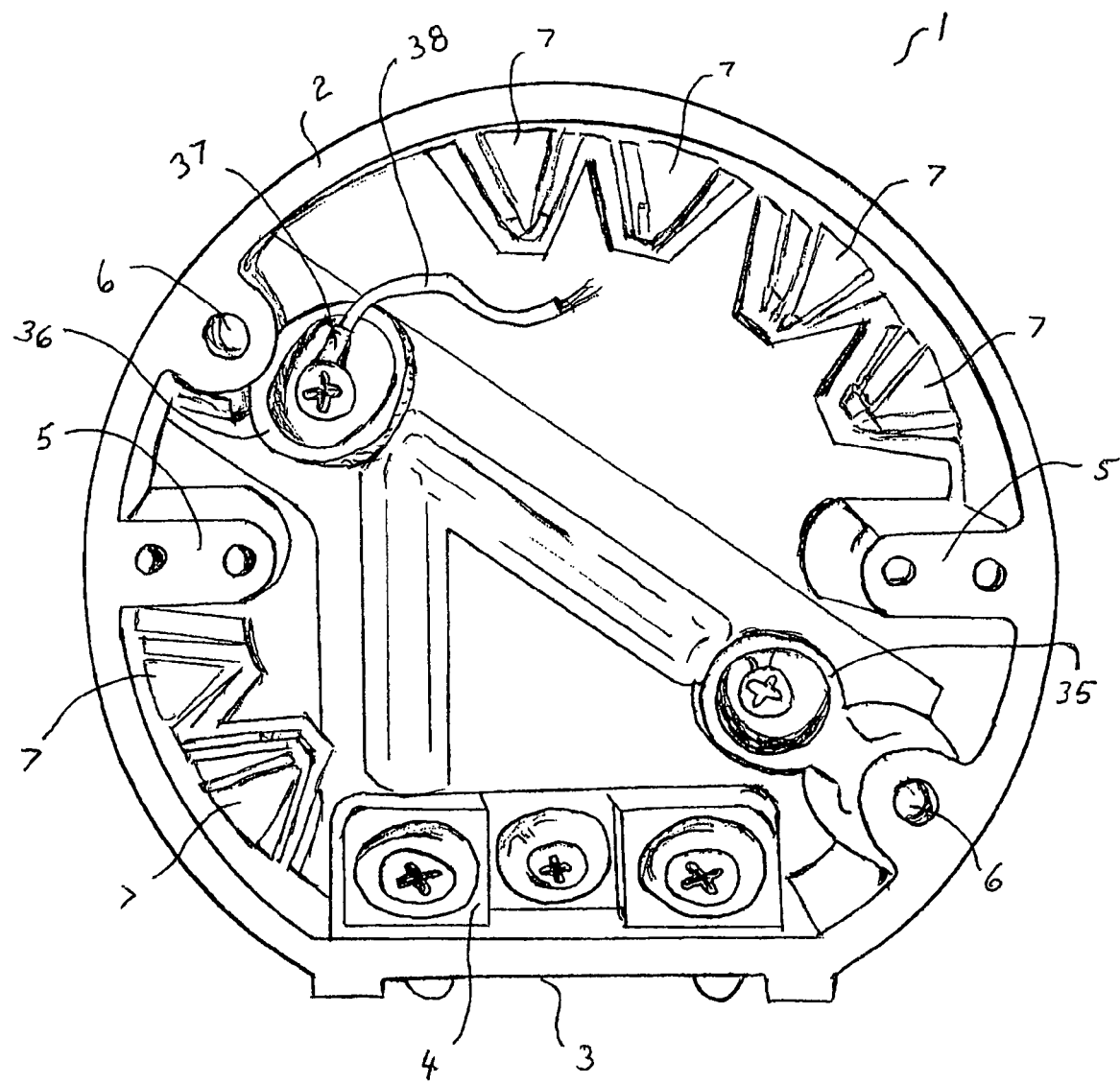
FIG. 4 is a perspective view of the internal features of the paddle fan box.

A top view is shown in FIG. 3, while a detailed interior view is shown in FIG. 4.

Box 1 has a generally round housing 2 with a truncated flat side 3. Angled mounting bracket 4 accommodating three fasteners is molded integral to flat side 3. Box 1 has several conventional apertures 7 with push-in clamping covers; it is noted that they accommodate wiring from different directions.

A pair of mounting brackets 5 accommodate fixture plates having two different hole spacings. These holes 26, as seen from the exterior, are shown in FIG. 3.

Besides paddle fan use, electrical box 1 can be used for lighting fixtures, sensors, or other applications in old and new work.

Figure 2:
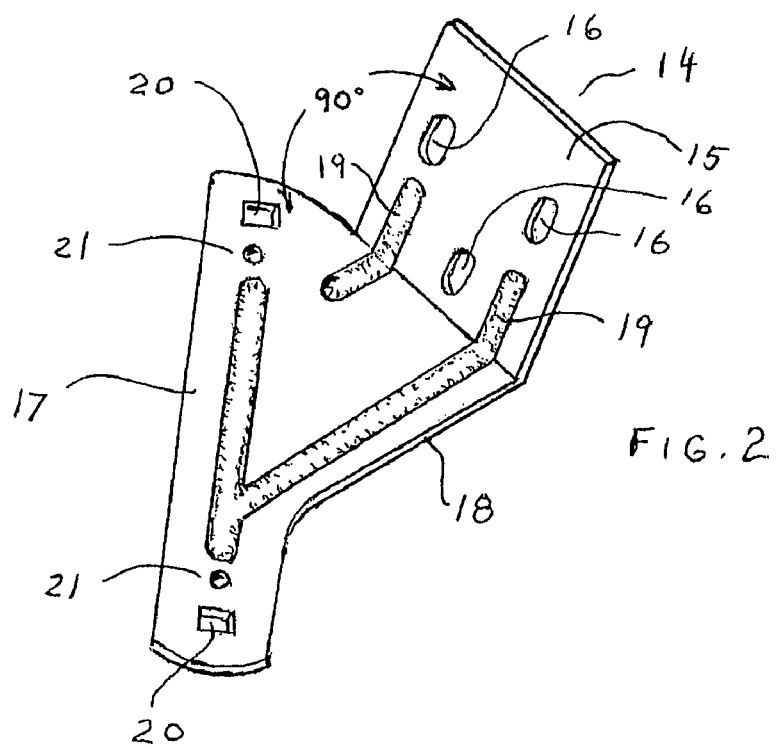
FIG. 2 is a perspective view of an L-bracket for use with the paddle fan box.

With the addition of accessory L-bracket 14 shown in FIG. 2, heavy loads can be supported. Vertical extension 15 with three elongated holes 16 fits flat side 3 of box 1 with holes 16 in registration with the exterior emerging holes of angled bracket 4. L-bracket surface 17 fits against the top of box 1 within a depressed region 27 shown in FIG. 3. Embossed features 19 stiffen L-bracket 14 and are accommodated by molded recess 29 on box 1 surface.

Figure 5:
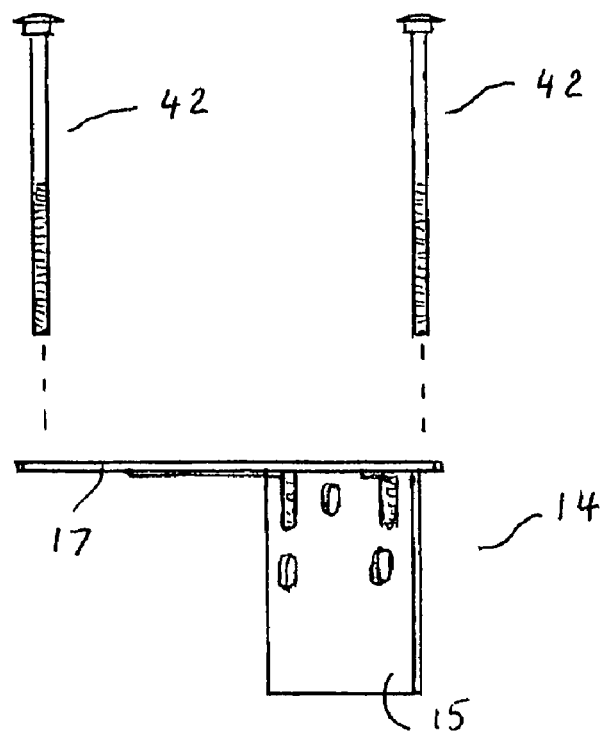
FIG. 5 is a side exploded view of the assembly including the L-bracket and the electrical box.
Figure 5:
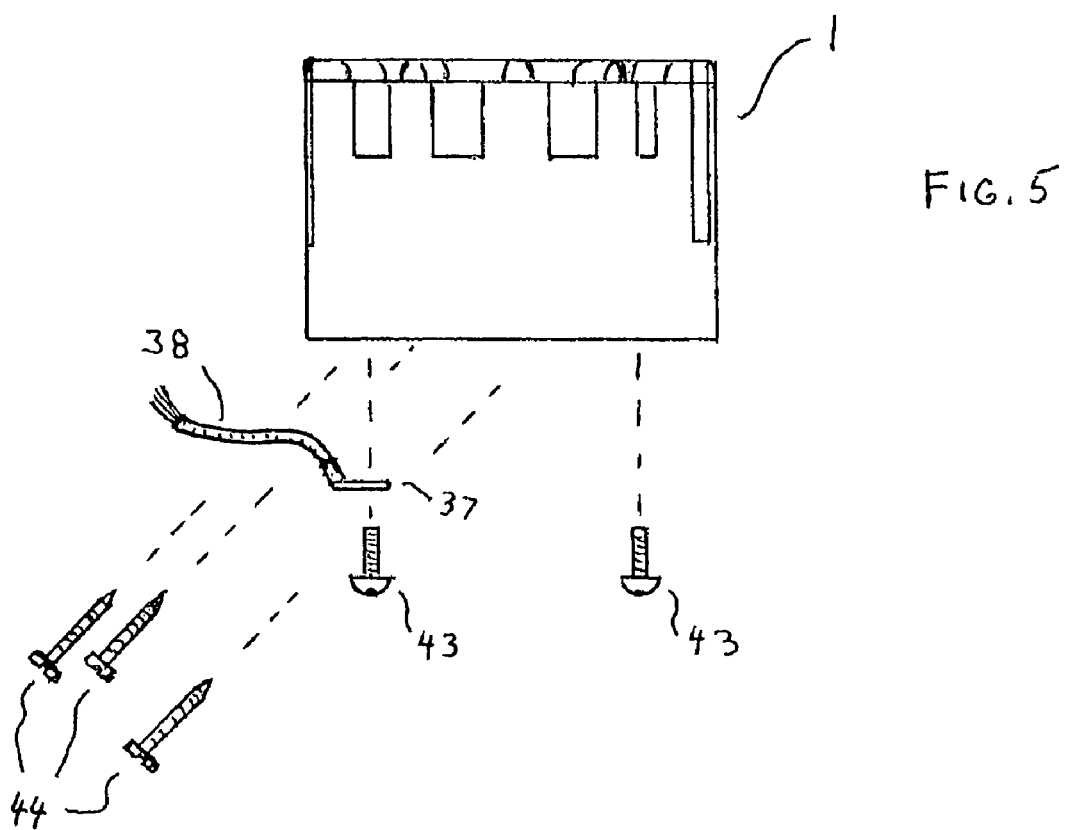

It is also noted that L-bracket angled edge 18 fits the contour 28 of depression 27. FIG. 5 is an exploded view of the assembly of L-bracket 14 with box 1.

It is further noted that when bracket 14 is placed over box 1, square holes 20 are in registration with box 1 holes 6. Carriage bolts 42 are placed through square holes 20 and beyond into box 1 holes 6 emerging beyond the bottom open face of box 1. The square holes 20 engage the square carriage bolt 42 features under the head to prevent turning so that nuts can be torqued from the bottom to retain a paddle fan or other heavy load. Screws 43 go through clearance holes 30 in the top of box 1 and retain L-bracket 14 by engaging threaded holes 21. One of screws 43 also is threaded through ring terminal 37 of grounding pigtail 38 thereby grounding bracket 14.

As shown in FIG. 4, a round reinforcing ridge 35 is molded around one of holes 30 while an oval ridge 36 to accommodate ring lug 37 is used around the other hole 30. Beam fastening screws 44 are introduced into bracket 4 within box 1 and emerge through holes 16 thereby fastening both box 1 and L-bracket 14 to a beam simultaneously.

Figure 6:
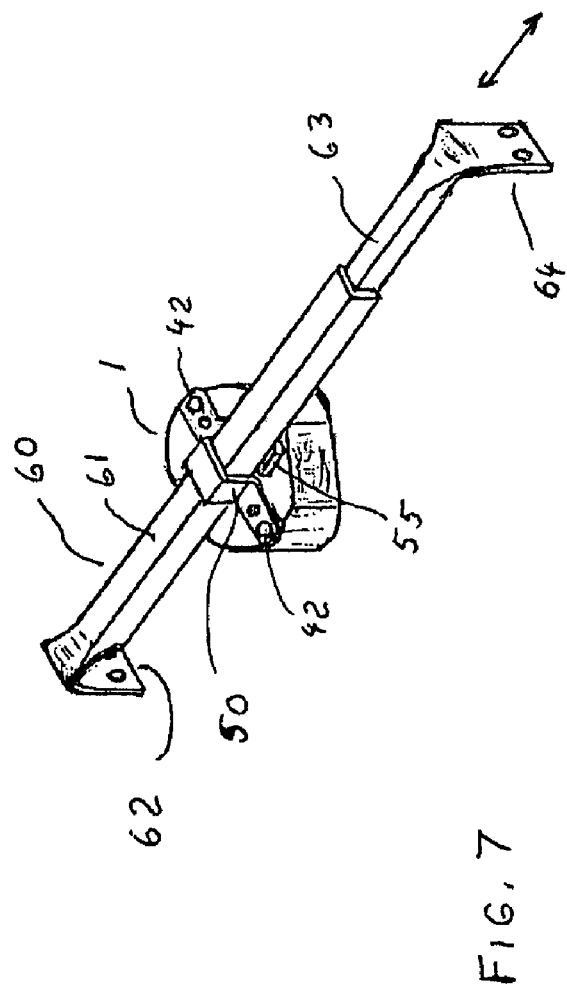
FIG. 6 is a perspective view of a heavy-duty bar bracket for use with the paddle fan box of this invention.
Figure 7:
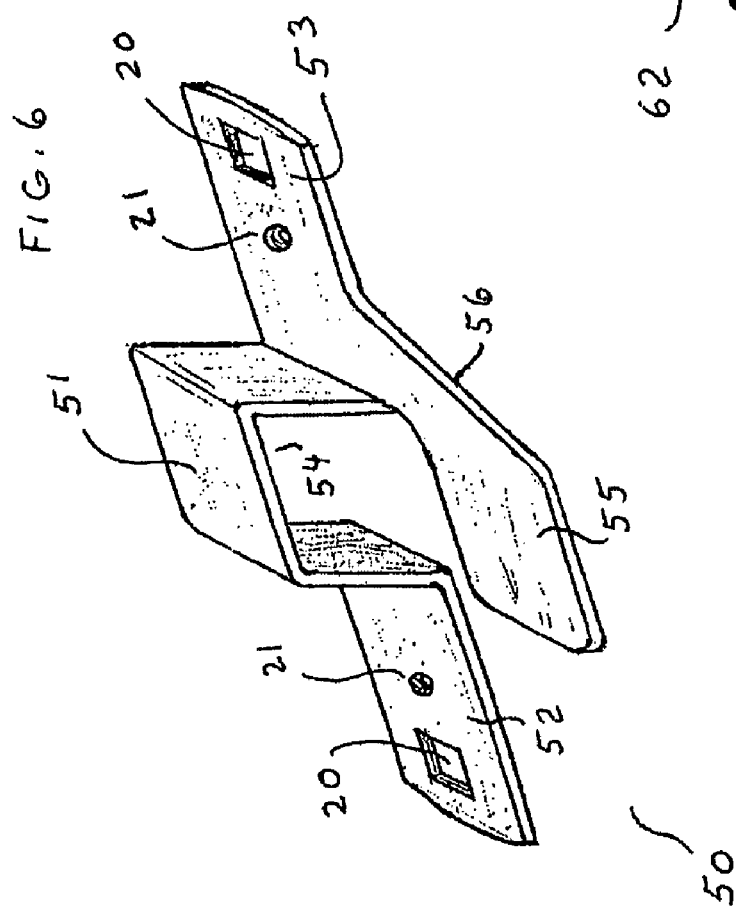
FIG. 7 is a perspective view of a paddle fan box attached to a telescoping bar.

For situations where a heavy load must be attached between two ceiling beams, a telescoping bar 60 as shown in FIG. 7 is used. It is attached to the paddle fan box of this invention via bar bracket 50 shown in FIG. 6. A rectangular telescoping bar 60 is shown although other crossectional shapes can be used. Bar 60 includes outer hollow bar 61 and inner sliding bar 63; each has attachment brackets 62 and 64 respectively for attachment to different ceiling beams.

Bracket 50 is mounted to box 1 in a similar fashion to mounting L-bracket 14, namely screws 43 engage threaded holes 21 from inside box 1. Edge 56 conforms to contour 28 of depression 27 of box 1. The material thickness of bar bracket 50 is the same as that of L-bracket 14 and equivalent to the depth of depression 27. Therefore, support extension 55 presents a flat footing surface to telescoping bar section 61. Recess 54 is sized and shaped to accommodate bar section 61.

Square holes 20, located at the distal ends of bracket 50, accommodate bolts 42 to bypass box 1 from the stress of any supported load.

In an alternate embodiment for lighter loads, a lighter bar 60 can be supported in a sheet metal bracket similar in shape to bar bracket 50 but with shorter wings truncated before square holes 20. Support extension 50 is then built up to the proper level by bending two or more material thicknesses. In the alternate embodiment, box 1 would support any load directly.

Therefore, the present invention is an improvement over the prior art because structural support ceiling fixture electrical work box 1 is interchangeable, whether it functions as an structural support ceiling fixture electrical work box for new work or old work. Conventional Madison-type clips may be used for securing the work box to the sheetrock. However because of the stability of the present configuration of structural support ceiling fixture electrical work box 1, auxiliary Madison clips may not be needed.

Box 1 can support a mounting plate of a paddle fan, a lighting fixture or a smoke/fire/carbon monoxide alarm attached to electrical box 1.

Opposite fixture plate mounting brackets may be provided to mount lighting fixtures or alarms thereto.

Housing box 1 is a mirror image reversible, so that it may be mounted on either side of a ceiling stud.

Furthermore, various modifications may be made to the present invention, which will become apparent from the pending claims, without departing from the spirit and scope of the present invention, as is noted in appended claims.

I claim:

1. A ceiling mounted electrical box for supporting light and paddle fan fixtures comprising:
   an extra deep cylindrical electrical box with a truncated flat side for attachment to a side wall of a ceiling beam;
   said electrical box having a top wall and a bottom open end;
   an angle mounted bracket within said box integral with said flat side for accommodating screws through said bracket into said side wall of said ceiling beam;
   apertures in said top wall having push-in clamping covers for accommodating wiring from different directions;

mounting brackets along an inside surface of the cylindrical wall of said box terminating at a lower edge of said box to accommodate fixture plates of said supporting light and paddle fan fixtures;

bottom surfaces of said mounting brackets having multiple threaded holes for alignment with hole spaces in said fixture plates;

said top wall having an offset oval reinforcing ridge surrounding a screw hole to accommodate a ring lug of a grounding pigtail.

2. A ceiling mounted electrical box for supporting light and paddle fan fixtures comprising:

an extra deep cylindrical electrical box with a truncated flat side for attachment to a side wall of a ceiling beam;

said electrical box having a top wall and a bottom open end;

an angle mounted bracket within said box integral with said flat side for accommodating screws through said bracket into said side wall of said ceiling beam;

apertures in said top wall having push-in clamping covers for accommodating wiring from different directions;

mounting brackets along an inside surface of the cylindrical wall of said box terminating at a lower edge of said box to accommodate fixture plates of said supporting light and paddle fan fixtures;

bottom surfaces of said mounting brackets having multiple threaded holes for alignment with hole spaces in said fixture plates;

said box having an accessory L-bracket for supporting heavy loads; and, said accessory L-bracket and said top wall of said electrical box have adjoining physical features including a recess being provided in said top wall into which a horizontal portion of said L-bracket is placed, wherein said top surface of said electrical box and said horizontal section of said L-bracket are flush with each other, thereby permitting a snug fit of said horizontal portion of said L-bracket into said recess of said top surface of said electrical box.

3. A ceiling mounted electrical box for supporting light and paddle tan fixtures comprising:

an extra deep cylindrical electrical box with a truncated flat side for attachment to a side wall of a ceiling beam;

said electrical box having a top wall and a bottom open end;

an angle mounted bracket within said box integral with said flat side for accommodating screws through said bracket into said side wail of said ceiling beam;

apertures in said top wall having push-in clamping covers for accommodating wiring from different directions;

mounting brackets along an inside surface of the cylindrical wall of said box terminating at a lower edge of said box to accommodate fixture plates of said supporting light and paddle fan fixtures;

bottom surfaces of said mounting brackets having multiple threaded holes for alignment with hole spaces in said fixture plates;

said box having an accessory L-bracket for supporting heavy loads; and, said L-bracket having a flat vertical extension which is mounted between said flat side of said box and said side wall of said ceiling beam, said vertical section having holes in registration with emerging holes of said angled bracket within said box.

4. The electrical box of claim 3 in which said L-bracket has a horizontal section at right angles to said vertical extension for engaging a top surface of said top wall of said box.

5. The electrical box of claim 4 in which said horizontal section of said L-bracket has square holes in registration with holes in brackets along the inner surface of the wall of said box to accommodate carriage bolts to permit nuts on said carriage bolts to be torqued from the bottom to retain the electrical fixture in place.

6. The electrical box of claim 5 in which the outer top surface of said top wall of said box and said horizontal section of said L-bracket have adjoining physical features which allow said top surface and said horizontal section to be flush with each other when mounted.

7. A ceiling mounted electrical box for supporting light and paddle fan fixtures comprising:

an extra deep cylindrical electrical box with a truncated flat side for attachment to a side wall of a ceiling beam;

said electrical box having a top wall and a bottom open end;

an angle mounted bracket within said box integral with said flat side for accommodating screws through said bracket into said side wall of said ceiling beam;

apertures in said top wall having push-in clamping covers for accommodating wiring from different directions; and, mounting brackets along an inside surface of the cylindrical wall of said box terminating at a lower edge of said box to accommodate fixture plates;

said box having an accessory L-bracket for supporting heavy loads; and, said L-bracket having a flat vertical extension which is mounted between said flat side of said box and said side wall of said ceiling beam, said vertical section having holes in registration with emerging holes of said angled bracket within said box.

8. The electrical box of claim 7 in which said L-bracket has a horizontal section at right angles to said vertical extension for engaging a top surface of said top wall of said box.

9. The electrical box of claim 8 in which said horizontal section of said L-bracket has square holes in registration with holes in brackets along the inner surface of the wall of said box to accommodate carriage bolts to permit nuts on said carriage bolts to be torqued from the bottom to retain the electrical fixture in place.

10. The electrical box of claim 9 in which the outer top surface of said top wall of said box and said horizontal section of said L-bracket have adjoining physical features which allow said top surface and said horizontal section to be flush with each other when mounted.

* * * * *